United States Patent [19]

Maddock

[11] Patent Number: 4,513,391
[45] Date of Patent: Apr. 23, 1985

[54] TEXT PROCESSING APPARATUS WITH TWO-STAGE FORMATTING OF TEXT

[75] Inventor: Robert F. Maddock, Southampton, England

[73] Assignee: International Business Machines Corporation, Armonk, N.Y.

[21] Appl. No.: 360,093

[22] Filed: Mar. 19, 1982

[30] Foreign Application Priority Data

Apr. 8, 1981 [EP] European Pat. Off. ........ 81301527.8

[51] Int. Cl.³ ............................................. G06F 15/00
[52] U.S. Cl. .................................................. 364/900
[58] Field of Search ................................. 364/200, 900

[56] References Cited

U.S. PATENT DOCUMENTS

| | | | |
|---|---|---|---|
| 3,915,278 | 10/1975 | Spence et al. | 364/900 |
| 3,974,493 | 8/1976 | de Cavaignac et al. | 364/900 X |
| 3,991,405 | 11/1976 | Boyd et al. | 364/900 |
| 4,040,024 | 8/1977 | Cowe et al. | 364/900 |
| 4,110,823 | 8/1978 | Cronshaw et al. | 364/200 |
| 4,195,353 | 3/1980 | Abe et al. | 364/900 |
| 4,198,685 | 4/1980 | Corwin et al. | 364/900 |
| 4,225,943 | 9/1980 | Busch | 364/900 |
| 4,247,906 | 1/1981 | Corwin et al. | 364/900 |
| 4,352,165 | 9/1982 | Hevenor, Jr. | 364/900 |
| 4,398,264 | 8/1983 | Couper et al. | 364/900 |
| 4,417,322 | 11/1983 | Berry et al. | 364/900 |

OTHER PUBLICATIONS

IBM Technical Disclosure Bulletin, vol 13, No. 5, Oct. 1970, "Keying Buffer in a Visual Editing System", R. L. McConnell, et al., pp. 1353-1354.

*IBM 3730 Distributed Office Communication System: Application Programmer's Reference*, IBM, GA33-30-31-1, Fifth Ed., 1980.

Primary Examiner—Gareth D. Shaw
Assistant Examiner—Ronni S. Malamud
Attorney, Agent, or Firm—James H. Barksdale

[57] ABSTRACT

Text editing and subsequent reformatting of a document is performed in two separate stages run as two parallel processes with different priorities. The editing of text is performed as a high priority process directly on a selected portion of the document previously copied under control of edit/format control logic 7 from a document store 5 into a refresh buffer 3. The editing process takes each keystroke as it is received by control logic 7 from keyboard 8 and enters it into buffer 3. The contents of the buffer 3 are directly mapped onto a display screen 2 so that the updated portion of the document is immediately seen by the operator. Should insufficient space be available in buffer 3 to accommodate an edited line of text, space is made available by controlled wordspill of text from the line into auxiliary storage prior to execution of the editing operation. Reformatting of the edited text is conducted as a low priority process taking one line of the document at a time and any words in auxiliary store for inclusion in that line. Reformatting is interrupted by the occurrence of keystroke signals requiring further editing of the text.

2 Claims, 7 Drawing Figures

TEXT PROCESSING APPARATUS WITH TWO-STAGE FORMATTING OF TEXT

BACKGROUND OF THE INVENTION

1. Field of the Invention

This invention relates to text processing apparatus in which text is formatted onto a display screen by means of a two-stage formatting process.

2. Description of the Prior Art

Modern text processing apparatus comprises a keyboard by means of which an operator can create and edit text documents and a display screen on which the document being created or revised can be displayed. Provision may also be made for filing, printing or processing the document created on the screen or alternatively communicating it electronically over a communications link to be viewed, filed, processed or printed at a remote location.

The IBM 3730 Distributed Office Communication System incorporates a so-called shared logic system in which a number of display terminals are connected to a local minicomputer or controller and exemplifies such text processing apparatus. In the IBM 3730 system, documents are stored electronically in permanent storage on an external media from where they are accessed in response to operator commands via keyboard entry.

When an operator wishes to view a document, the document is placed in working storage assigned to that operator and the document, or part of it, is then transferred under control of a software editor from working storage in an IBM 3791 controller to a display refresh buffer of an IBM 3732 text display terminal. The contents of the refresh buffer are displayed directly on the screen. Text keyed into the system by the operator is entered directly into the refresh buffer and therefore appears on the screen as it is keyed. Periodically, the contents of the refresh buffer are sent to the controller and the document in working storage updated under control of the software editor. Normally, document update occurs in response to an operator 'enter' command from the keyboard. When the document in working storage has been edited to the operator's satisfaction, a 'store' command is used to store the document in permanent storage.

From the foregoing it is seen that there may be one version of the document permanently stored on the external media; a somewhat more up-to-date version in working store; and a fully updated version in the refresh buffer and thus on the screen.

The provision of a microprocessor and random-access memory (RAM) in a display terminal has made it generally possible to take function out of the controller and put it instead in the terminal itself. If follows that it is desirable to arrange for editing and formatting processes to be performed automatically entirely in the display terminal and at a speed so as not to interfere with keystroke entry by the operator. One proposal described in our co-pending European Application No. 80302196.3 involves arranging for a single unformatted version of the document stored to be updated at each keystroke. Formatting and mapping to the screen is then a one way process which is performed as required, for example, after each editing action. This separation of the document formatting and editing processes would eliminate the need to store several versions of the document and significantly simplify the hardware and software.

In the IBM 3730 however, documents are stored on the external media in System Network Architecture (SNA) Character Set (SCS) format whereas the version of the document in working store is in a format between SCS and that sent to the IBM 3732 to display part of the document. The manual entitled IBM 3730 Distributed Office Communication System: Application Programmer's Reference (GA33-3031-1), copyright 1980, published by International Business Machines Corporation describes the SCS data stream in some detail.

Transformation from SCS to displayed form is performed sequentially through the document from top to bottom. Transformation from working store format to 3732 format is done on parts of the document as they are displayed. Changes to the document by the operator require reverse transformation repeatedly and in fragments during editing. This could be avoided by making the keyed changes directly on the SCS form and making forward transformation to display the updated document as described in our aforesaid co-pending application. The problem with this arrangement is that the transformation must be done at a speed of the same order as keystroking and the microprocessor may not be sufficiently powerful to perform this transformation with the formatting constraints of the IBM 3730.

SUMMARY OF THE INVENTION

The solution afforded by this invention is to perform the editing/formatting process in two separate stages run as two parallel processes with different priorities. Thus a foreground process takes each keystroke and enters it into the refresh buffer where sufficient formatting is performed to enable the next keystroke to be taken. A background process reformats the text one line at a time when no keystroke is pending. The editing and reformatting procedure performed in two synchronised processes run with different priorities makes smaller demands on the microprocessor. Keystrokes are entered directly onto the screen and thence to the document enabling the operator to see immediately the effect of entering a keystroke. Reformatting in this way, one line at a time means that it can be interleaved with normal keystroke processing.

BRIEF DESCRIPTION OF THE DRAWING

In order that the invention may be fully understood, a preferred embodiment thereof will now be described with reference to the accompanying drawings.

DESCRIPTION OF THE PREFERRED EMBODIMENT

Figure 1:
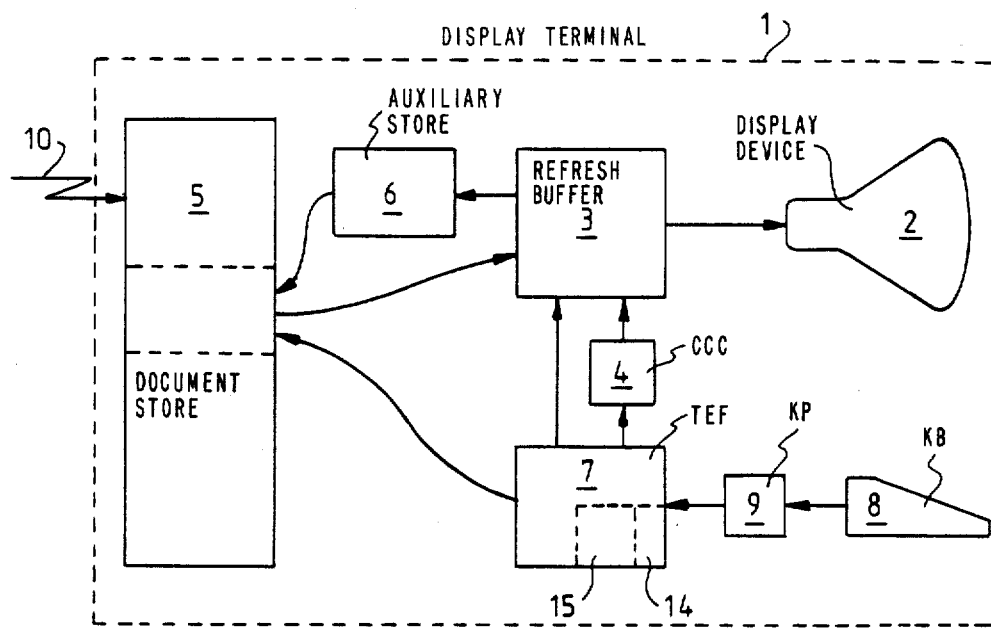
FIG. 1 shows a schematic representation of a display terminal according to the present invention.

Referring first to FIG. 1 a simplified diagram of a display terminal 1 is shown comprising a CRT display device 2, a refresh buffer 3, a cursor control circuit (CCC) 4, document store 5, auxiliary store 6, text editor/formatter (TEF) 7, keyboard (KB) 8, and keystroke processor (KP) 9.

During operation, a document, or part of a document, received from an external unit (not shown) over a communications link 10 in SNA-SCA form, is loaded in conventional manner into the document store 5 in a form close to that to be displayed. Thus the document information is inspected as it is received; divided into individual lines; and all formatting information is imbedded in the SNA-SCS data stream noted. A separate extent of storage space, which for convenience will be referred to hereinafter as a segment, is allocated for each line of the document loaded. A pointer, for example the actual machine address, is returned for each segment and held in a pointer list. The pointer list provides indexes to lines of text and is part of a tree structure, shown in FIG. 2, used by the text editor/formatter to facilitate subsequent location and updating of portions of the text.

Figure 2:
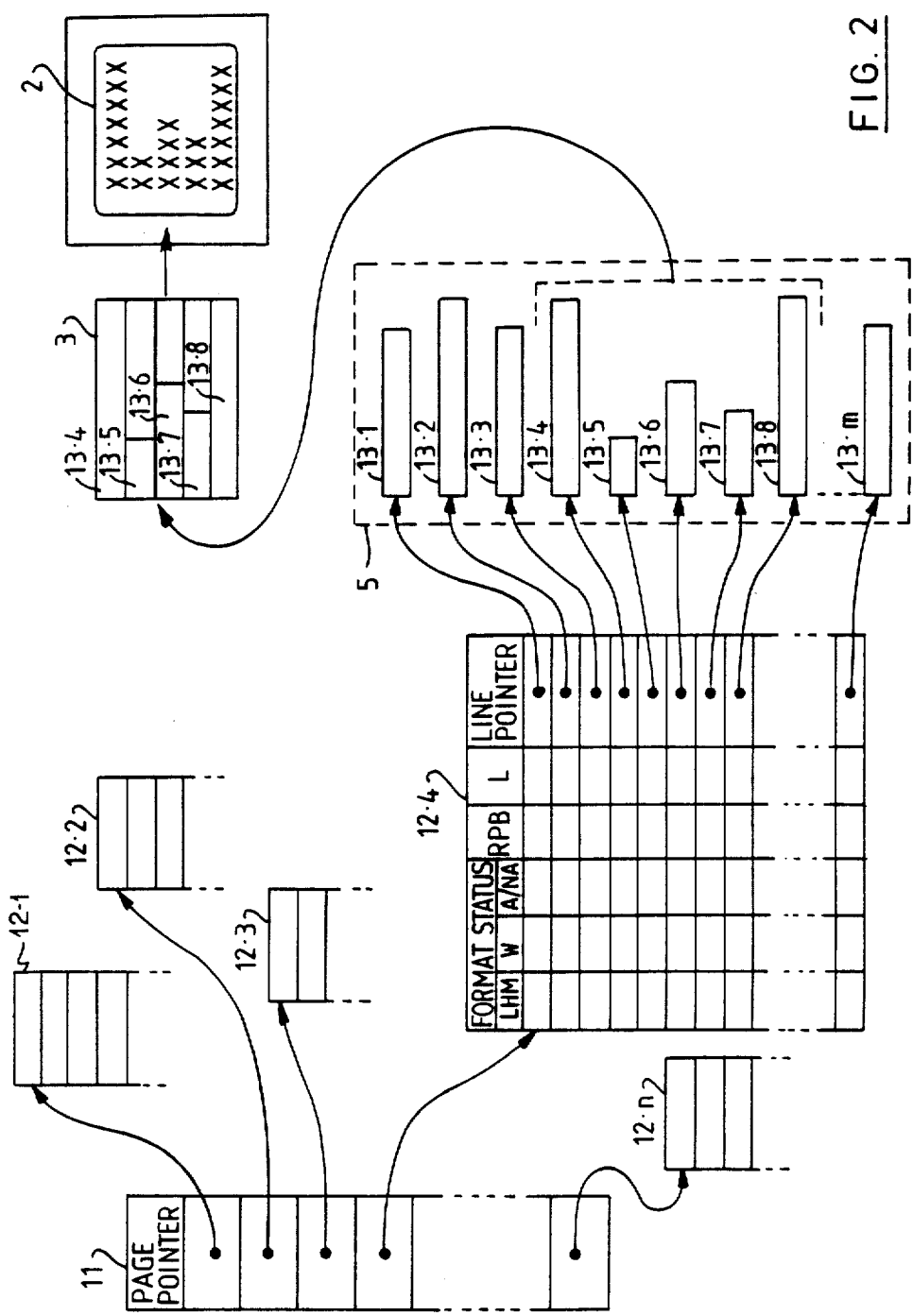
FIG. 2 shows the storage management system for documents in the terminal shown in FIG. 1.

The tree structure shown in FIG. 2 consists of a page index 11 containing a list of page pointers, each of which identifies a line index 12.1 to 12.n for the corresponding page. Each line index 12.1 to 12.n contains a list of line pointers identifying the addresses of the segments 13.1 to 13.m, referred to above, storing the document lines of the selected page in the document store 5. In addition to the line pointers, the index entry for each line contains information concerning current format status of the line; line length (L); and a Reformat Pending Bit (RPB) indicating by its state whether or not further reformatting of the line is pending as a consequence of a previous text edit operation. The Format Status information held in a line index entry includes, left-hand margin width (LHM); document width (W); and whether the apparatus is in adjust or non-adjust (A/NA) mode of operation. Although not shown in FIG. 2, the page index also holds a count of the number of pages in the document and each line index holds a count of the number of lines in the associated page.

The refresh buffer 3 provides storage locations on a character-by-character basis for all displayed characters on the screen of the CRT 2. Thus each line of the refresh buffer is as long as the screen is wide, providing as many storage locations as there are character positions along a line. The portion of the document to be displayed is read by the editor/formatter as character strings accessed from the document store 5 by means of the tree structure and copied into the refresh buffer 3. No more than one line of text is entered into each line buffer, and since the lines are of varying length, varying lengths of free storage space are provided at the righthand ends of the line buffers. Further, since the refresh buffer has a fixed mapping to the screen, any blank margins or other spaces on the document are explicitly represented. For completeness, this mapping of the document portion into the refresh buffer is shown in FIG. 2. Control circuits (not shown) synchronise the CRT scanning with display buffer accessing in a conventional manner so that the contents of the buffer 3 are continuously displayed on the screen of the CRT 2.

Keystrokes representing text and commands entered by an operator via keyboard 8 are decoded by keystroke processor 9 and supplied to text editor/formatter 7. The operation of the apparatus, according to the present invention, is such that text entered either as a new document, or as part of an editing operation on an existing document, is directed by the text editor/formatter to the refresh buffer and entered in the position corresponding to the screen cursor position. Cursor control signals supplied from the editor/formatter 7 to cursor control circuit 4 continuously update the cursor position on the screen in a conventional manner to provide visual feedback for the keyboard operator identifying the portion of the text currently accessed.

During text editing operations, keystrokes from the keyboard 8 are processed by an interrupt handler 14 forming part of the editor/formatter 7 software to capture the keyed character and put it into a keystroke queue 15 to be processed. The editor thereafter takes keystrokes in order from this queue 15 and directly updates the portion of the document held in the refresh buffer 3, and thus displayed on the screen. Only when the screen 'window' moves, and lines are no longer displayed are they put back into the storage segments. This means that extension and truncation of lines is done most often on the screen where there are blanks in the right margin, and less often in the segments where there is a storage management overhead in changing length.

If the character delete key is pressed, the character at the current cursor position on the screen is deleted. This is achieved by manipulating the contents of the refresh buffer in conventional manner. In this case another pending keystroke in the keystroke queue can always be immediately processed. Other key command entries which, for example, may cause word or line deletion, underlining portions of text etc., are also done by manipulating the contents of the refresh buffer. The implementation of such editing operations and even more complex operations involving block move, block insert, phrase searching, for example are quite conventional. A detailed description of the manipulation of buffer store contents to perform such editing operations is not required for an understanding of the present invention and accordingly will not be given herein.

Figure 3:
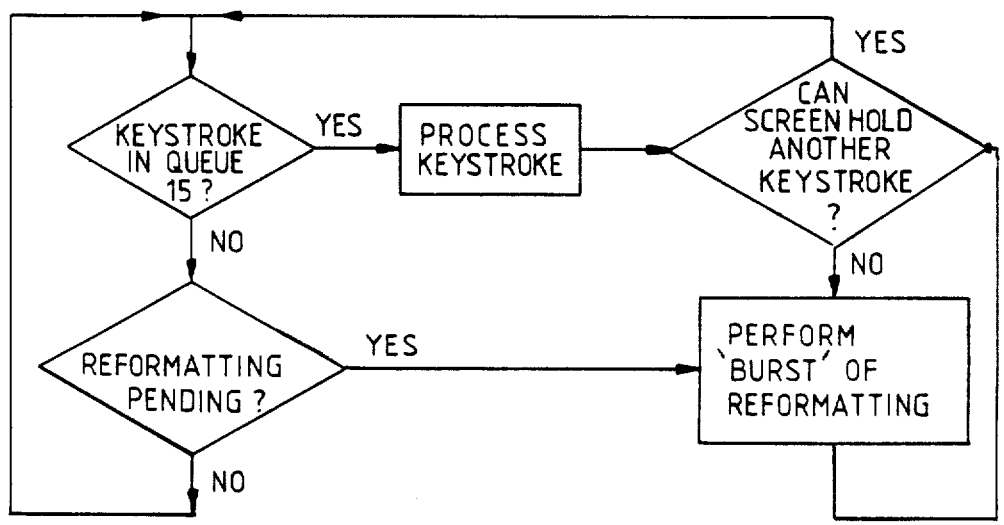
FIG. 3 shows a flow diagram of the text editor/formatter software controlling the operation of the terminal shown in FIG. 1.

Whereas some keystrokes merely insert or delete a single character on a line, others imply more complex reformatting involving, for example, wordspill forward or backward, margin changes, and so on. The amount of reformatting required following such editing operations is so variable that it cannot always be performed in the time available between keystrokes. Accordingly, since it is important from the human factors standpoint for the operator to see at once the effect of keystroke entry on the screen, provision is made, in accordance with the present invention, for the updating or reformatting of the document following editing to be done if necessary in two stages, one running as a foreground process interleaved with the keystrokes in the keystroke queue, and the other as a background process run in individual bursts when there are no keystrokes pending in the keystroke queue. A flow chart summarising the operation of the editor/formatter 7 in accordance with the present invention is shown in FIG. 3.

The largely editing foreground process and reformatting background process are synchronised and run in parallel with different priorities under control of the text editor/formatter software. During the foreground process, each keystroke in the queue 15 is taken one at a time and entered onto the screen. Reformatting of the document following the editing operation is performed subsequently when there are no keystrokes pending in the keystroke queue. Although pending keystrokes normally take precedence over document reformatting, should the line buffer become full during editing, then some reformatting of the line is performed during the foreground process to enable another keystroke to be accepted. Thus for example, the editor takes a graphic character in the queue, inserts it into the display line on the screen at the current cursor position and shifts the remainder of the line right one character position. This is done by manipulating the content of the corresponding line of the refresh buffer in conventional manner. Additional characters can then be accepted with further line shift to the right, temporary extension of lines of text in this way can often be accommodated by the blanks in the right margin of the document. Should the situation arise where the screen line is full then the current line must be partially reformatted before another keystroke is accepted for processing. This foreground reformatting will load spilt characters into locations allocated for each line in auxiliary store 6 where they are held until they can be dealt with during the background reformatting. Auxiliary store 6 is provided as a contiguous block of storage locations addressable by the editor/formatter 7. Storage for spilt text is allocated dynamically by the editor/formatter as required on a line-by-line basis. A pointer to the storage location address for the spilt text for each line, together with an indication of the length of the spilt text, is entered into an auxiliary store table by the editor/formatter 7. The construction of the auxiliary store table is organised so that entries are always maintained in document line order. This ensures that the first entry in the table points to the address in auxiliary store 6 of spilt text associated with the first line of the document requiring reformatting.

On completion of a foreground process and providing no further keystroke is pending in the queue, the background reformatting is run. This carries out all the reformatting implied by the changes made during the foreground editing and is run in short uninterrupted bursts which, in this embodiment will process one line of text a time. Although the time available for the background reformatting depends upon the operator demands, once the background reformatting is commenced it will not be interrupted until the reformatting of the current line is completed. Typically, the first line of text which requires reformatting is remade by taking the line and any spilt text held in auxiliary store from the previous line and storing any text spilt forward to the next line. This process is repeated whenever there is a pause between keystroke input and the keystroke queue is empty, until the whole of the current page has been updated. Since the reformatting bursts of a line at a time are short compared to typical inter-keystroke time, reformatting is generally performed as a substantially continuous operation.

Editing/formatting operations will now be described to illustrate the individual steps taken to reformat a portion of a document following an editing operations in accordance with the present invention. An editing/formatting operation involving character insertion resulting in forward spill of text is described with reference to FIG. 4. Two examples of editing/formatting operations involving character deletion resulting in backward spill of text are shown respectively in FIG. 5 and FIG. 6. In all these figures, the contents of the refresh buffer 3, and hence the information displayed on the screen is shown for each step of the operation performed. For simplicity, the lines of text are assumed to be only 14 character spaces in length (W=14); the left-hand margin is set to zero (LHM=0); the screen width is equivalent to 17 characters; and the apparatus is in adjust mode of operation (A/NA=0). A part of the table 12.1 to 12.n associated with the contents of the buffer 3 at each step of the operation is shown at the left-hand side of the figure and gives the current line length (L); the maximum document width (W); and the state of the Reformat Pending Bit (RPB) for each line in the buffer. If reformatting is pending for a line then the RPB associated with that line is set to a '1' state. There are two conditions which result in the Reformat Pending Bit being set as will be explained hereinafter.

Figure 4:
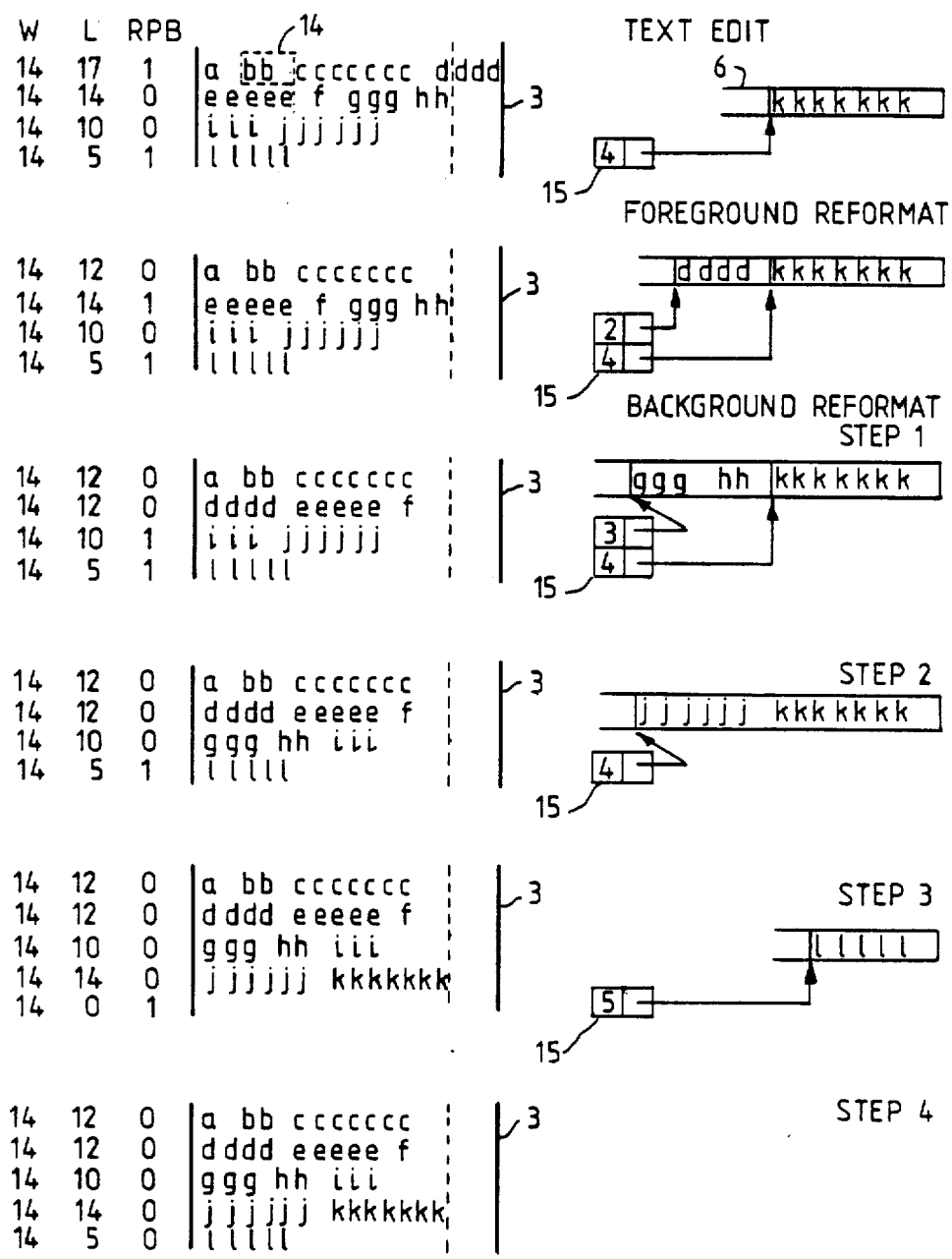
FIG. 4 illustrates the reformatting of a document following a text edit operation involving the insertion of text into a document line which resulted in text spill forward from the current line to the next line.

Referring to FIG. 4, the reformatting steps following a text edit operation which involved insertion of text resulting in overflow or spill forward of text from the buffer 3 will now be described. The text in the buffer and thus on the screen is shown as individual words, each represented by a group of lower-case letters e.g., bb, ggg, a, 11111, etc. In the particular example given, the text edit operation performed involves the insertion of a two letter (plus blank) word 'bb' (shown in dotted block 14) into line 1. As an added complication, prior to this text edit operation, reformatting of the text in buffer 3 was already in progress. The text edit operation interrupted reformatting at a time when a seven letter word 'kkkkkkk' from line 3 was in auxiliary store 6 pending insertion into line 4. The Reformat Pending Bit for line 4 had been set (RPB=1), indicating that this line was the next line to be reformatted. A pointer to the allocated storage location address in auxiliary store was held in auxiliary store table 15 in line number order. The lengths of the four lines of text in the portion of the document being worked on were 14, 14, 19 and 5 respectively (discounting the character space at the end of each line).

The situation schematically portrayed in the first section of FIG. 4 marked TEXT EDIT represents the condition of the text after insertion of the word 'bb'. From this it is seen that after insertion of the first character of the word, the document width W was exceeded. This condition is flagged by the edit/format control logic which continuously compares line length L with document width W and sets the Reformat Pending Bit for the line (RPB=1) indicating that the line will eventually require reformatting. However, insertion of the whole word completely fills the line and reformatting is forced before another keystroke can be accepted. This need for some reformatting during the foreground editing process is detected by the edit/format control logic which continuously compares the length L of the line with the buffer line capacity.

The foreground reformatting forced by the line full condition is completed by the editor/formatter software as soon as a potential overflow condition is flagged. A portion of auxiliary store 6 is allocated to receive the entire length of the word extending beyond the document right-hand margin defined by document width W. In this case five character spaces are required for the word 'dddd' (including character space). A pointer to the allocated storage location address is returned and held in Auxiliary Store Table 15 in line number order. Since text is now temporarily held in auxiliary store for insertion in line 2, this line will require reformatting and accordingly the edit/format control logic sets the Reformat Pending Bit for line 2 (RPB=1) and resets the Reformat Pending Bit for line 1 (RPB=0). This situation is shown in the second section of FIG. 4 marked FOREGROUND REFORMAT. From this it is seen that the two spilt words from lines 1 and 3 are stored in consecutive storage locations in auxiliary store 6, and pointers identifying the respective addresses are held as two entries in Auxiliary Store Table 15. It is convenient to allocate successive storage locations in auxiliary store 6 to hold the spilt words in this way since, by so doing, the length of each spilt portion of text can easily be ascertained from the pointers in Table 15. The actual lengths of the portions therefore need not be explicitly recorded. The ordering of the pointers in the Table 15 is such that the first pointer encountered by the editor/formatter on subsequent access to the Table is that associated with the first line of text in the document requiring reformatting. The second pointer encountered is that associated with the second line of text requiring formatting, and so on. Thus, the first entry in Table 15 contains the pointer for the text to be inserted at the beginning of line 2. This is immediately followed by the pointer for the text to be inserted at the beginning of line 4.

This completes the simple text edit operation used to illustrate the invention and background reformatting is commenced. The text editor/formatter ascertains by scanning the Reformat Pending Bit for the lines that line 2 is the first line requiring background reformatting. The first entry in the Table 15 contains the pointer to the word 'dddd' to be inserted in line 2. This word is retrieved by the reformatting software and combined with the existing contents of line 2. Since the document width is exceeded, the editor/formatter detects an overflow condition and allocates sufficient space in auxiliary store 6 to hold the two spilt words of text 'ggg hh'. A pointer is returned identifying the allocated storage address and is entered in Table 15 in place of the previous entry for line 2 which is no longer required. It should be noted that the pointer for line 3 will be numerically different from that for line 2 since in this case more text has been spilt forward. Since text is again spilt forward for inclusion in the next line, the Reformat Pending Bit for line 3 is set and that for line 2 is reset. This concludes the first burst of background reformatting leaving the text in the situation shown in the third section of FIG. 4 marked BACKGROUND REFORMAT STEP 1.

Assuming there is still no keystroke pending in the queue, a second burst of background reformatting is performed. During this burst of reformatting the editor/formatter identifies that line 3 needs reconstructing. The text 'ggg hh' is retrieved from auxiliary store 6 by means of access to the first entry in Table 15 and inserted at the beginning of line 3. The text already in line 3 is shifted right, and a word of text is spilt. Again storage locations in auxiliary store 6 are allocated for the whole of the word 'jjjjjj' spilt forward, although the document width was exceeded by only 3 character spaces. A pointer is returned identifying the allocated storage address and is entered in Table 15 in place of the previous entry for line 3 which is no longer required.

The Reformat Pending Bit for line 4 is already set and that for line 3 is reset. The Table 15 now contains two words for insertion in line 4 and, because of the method of allocating space in auxiliary storage, these two words are physically located in consecutive locations of auxiliary store 6 and in the required order enabling the pointer to the second word 'kkkkkkk' to be dropped from Table 15. This completes the second burst of reformatting leaving the text in the situation shown in the fourth section of FIG. 4 marked STEP 2.

Assuming again no keystroke is pending in the queue, the next burst of reformatting is performed. This involves the insertion of the two words 'jjjjjj kkkkkkk' in line 4 resulting in the shifting to the right of the previous contents of the line. Since the line is entirely filled by the added text, reformatting results in the five character word '11111' previously in line 4 being stored in auxiliary store 6. A pointer is returned and entered in the Table 16. The Reformat Pending Bit for line 5 is set and that for line 4 reset. This completes the third burst of reformatting leaving the text in the situation shown in the fifth section of FIG. 4 marked STEP 3.

In the absence of a keystroke in the keystroke queue, the final burst of reformatting is performed. During this final burst, the word '1111' is accessed from auxiliary store 6 and entered in new line 5. Reformat Pending Bit for line 5 is reset. This completes the final burst of reformatting leaving the text in the situation shown in the fifth section of FIG. 4 marked STEP 4. Now that reformatting is complete there is no text in auxiliary store 6, and no entries in Table 15.

Although a pending keystroke can always be processed after a character deletion, reformatting of text following text deletion will now be described in order to show how this is achieved using the modified apparatus of the present invention.

Two tests are made by the editor/reformatter following deletion of text from a line. The first test ascertains whether or not there is available space in the previous line to accommodate any word or words remaining in the current line from which text has been deleted. If there is available space, then the reformatting process operates to cause backspill of any word or words that can be accommodated from the current line into the previous line. Should there be insufficient space then the second test is made. This test ascertains whether or not the available space at the end of the current line is sufficient to accommodate any word or words from the next line. If the conditions of this test are met then the reformatting process operates to cause backspill of the word or words that can be accommodated from the next line into the current line.

More specifically, following deletion of text from a line, the editor/formatter software performs the first test determining the difference between the L and W values for the previous line and comparing this difference with the character length (plus required character spaces) of the first word of the current line. If the test shows that a word can be accommodated in available space at the end of the previous line, then the editor/formatter sets the Reformat Pending Bit for the previous line, indicating that this line requires to be reconstructed as part of the background reformatting procedure.

The editor/formatter software performs the second test by determining the difference between the L and W values for the current line and comparing this value with the character length (plus required character spaces) of the first word of the next line. If the test shows that a word can be accommodated in available space at the end of the current line then the editor/formatter operates to set the Reformat Pending Bit for the current line indicating that this line requires to be reconstructed as part of the reformatting procedure.

Figure 5:
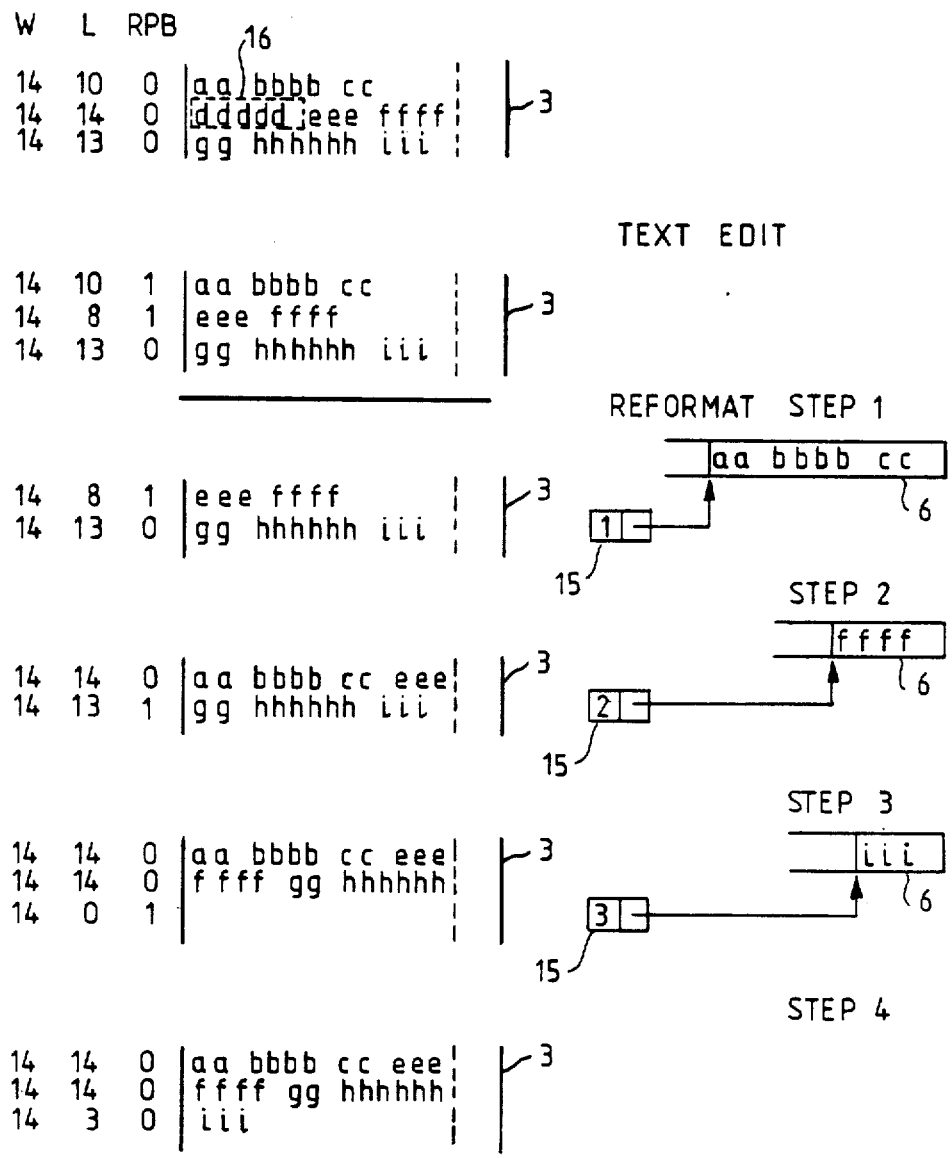
FIG. 5 illustrates the reformatting of a document following a text edit operation involving the deletion of text from a document line which resulted in text backspill from the current line to the previous line.

Referring now to FIG. 5, a situation prior to a text edit operation involving deletion of text is shown in the first section. A five character word 'ddddd' (shown in dotted box 16) is to be deleted from the beginning of line 2 with consequent left-shift of the remaining text. The situation following the deletion of text is shown in the second section of FIG. 5 marked TEXT EDIT. From this it is seen that the first word 'eee' remaining in line 2 can now be accommodated in the four character space provided at the end of line 1. Thus, in this example, performance of the first test referred to above indicates to the text editor/formatter that backspill of text from line 2 into line 1 is required during the background reformatting process. At this point in time backspill is also possible from line 3 into line 2. Accordingly, the Reformat Pending Bits for line 1 and 2 are set indicating that both these lines need reconstructing as shown in the TEXT EDIT section of FIG. 5.

Backspill of a line into a previous line is achieved by taking the entire text from the previous line and prefixing it for insertion into the beginning of the next line. After insertion the new line contains backspilt text and is inserted again in the buffer in the place of the deleted previous line. Thus, in the absence of a pending keystroke in the keystroke queue, the reformatting procedure detects from the Reformat Pending Bit for line 1 that this is the first line requiring reconstruction and stores the entire line 'aa bbbb cc' in allocated locations of auxiliary store 6. A pointer to the address of the text is returned in the usual way and inserted as the first item in auxiliary store-table 15. This situation is shown in the third section of FIG. 5 marked REFORMAT STEP 1. This reformatting step has caused the deletion of the original line 1 which is now held in store ready for insertion in the original line 2. The line 2 when reformatted will become the new line 1, and so on. The editor/reformatter sets the Reformat Pending Bit for the new line 1 indicating that this line needs reconstructing.

Subsequent reformatting steps perform the insertion of the pending text held in auxiliary store 6 into the remaining text in the manner previously described for text insertion with reference to FIG. 4. Thus, at the end of the second burst of reformatting, the situation is as shown in the fourth section of FIG. 5 marked STEP 2. From this it is seen that the text 'aa bbbb cc' has been inserted in the new line 1 and a word 'ffff' from line 1 has been stored in auxiliary store 6 for insertion in line 2. A pointer to the address in auxiliary store is returned in the usual way and entered in the Table 15. The Reformat Pending Bit for line 1 is reset and that for line 2 is set.

At the end of the next burst of reformatting, the situation is as shown in the fifth section of FIG. 5 marked STEP 3. The insertion of the word 'ffff' in line 2 has resulted in word 'iii' of three character length being spilt forward and allocated space in auxiliary store 6. A pointer has been inserted in Table 15 in the usual manner. The Reformat Pending Bit for line 2 is reset and that for line 1 is set.

Following the final burst of reformatting, the situation is as shown in the sixth section of FIG. 5 marked STEP 4. Here the word 'iiii' has been inserted into new line 5, the Reformat Pending Bit for line 2 has been reset. The auxiliary store is now empty; no pointers are held in the Table 15; and the reformatting following the original text edit operation is complete.

Figure 6:
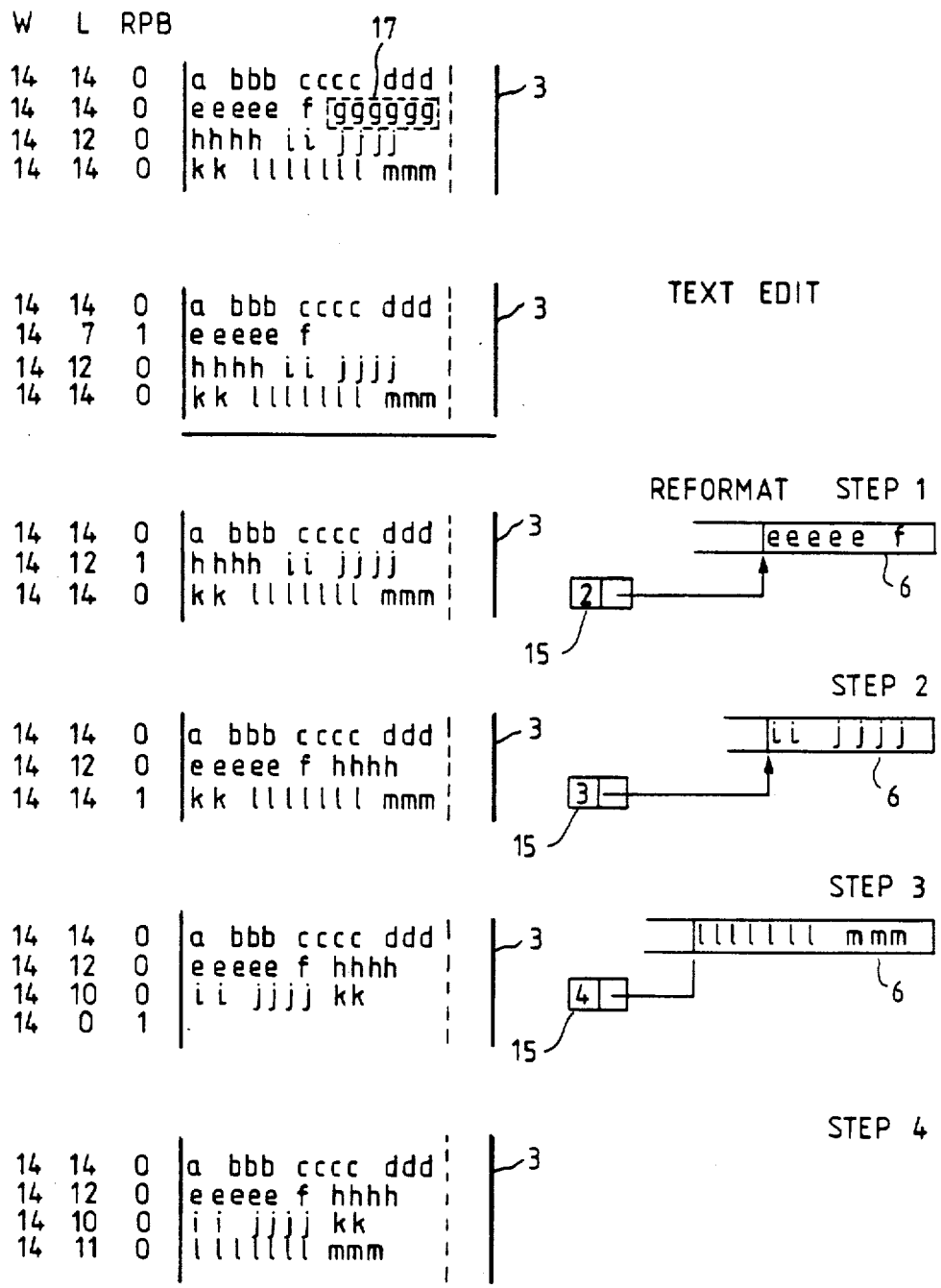
FIG. 6 illustrates the reformatting of a document following a text edit operation involving the deletion of text from a document line which resulted in text backspill from the next line to the current line.

The second example of reformatting following deletion of text by a text edit operation will now be described with reference to FIG. 6. In this case, a situation prior to a text edit operation involving deletion of text is shown in the first section of FIG. 6. A six character word 'gggggg' (shown in dotted block 17) is to be deleted from the end of line 2 of the text. Since the previous line is full the first test previously described ascertains that no backspill from the current line 2 to previous line 1 is possible. The second test ascertains however that the first word in line 3 can now be accommodated in the space made available at the end of line 2 so that backspill of line 3 into line 2 is possible. The text editor/formatter detects this condition and sets the Reformat Pending Bit for line 2. This is the situation shown in the second section of FIG. 6 marked TEXT EDIT.

The reformatting of this line is achieved by shifting the entire contents of line 2 out of the refresh buffer into auxiliary store 6. A pointer to the address of the text 27 is returned in the usual way and inserted as the first item in auxiliary store table 15. This burst of reformatting results in the deletion of the original line 2, so that the original line 3 after reconstruction becomes the new line 2, and so on. Following the storing of text 'eeeeee f' in auxiliary store 6, the editor/formatter sets the Reformat Pending Bit for the original line 3 now the new line 2. The situation at the end of this burst of reformatting is as shown in the third section of FIG. 6 marked REFORMAT STEP 1.

Subsequent reformatting steps perform the insertion of the pending text held in auxiliary store into the remaining text in the manner described with reference to FIG. 4. The situation at the end of the second burst of reformatting is as shown in the fourth section of FIG. 6 marked STEP 2. Insertion of words 'eeeee f' into line 2 has caused forward spill of text 'ii jjjj' for inclusion in line 3. Accordingly, Reformat Pending Bit for line 2 is reset and that for line 3 is set. A pointer to the address in auxiliary store 6 is inserted in Table 15. Insertion of text 'ii jjjj' into line 3 has caused forward spill of text '1111111 mmm' for inclusion in a new line 4. Accordingly, Reformat Pending Bit for line 3 is reset and that for new line 4 is set. The spilt text is stored in auxiliary store 6 with a pointer inserted in Table 15. The situation is now as shown in the fifth section of FIG. 6 marked STEP 3. The final burst of reformatting inserts the text '1111111 mmm' in the new line 4 and the Reformat Pending Bit for line 4 is reset. Reformatting of the text is now complete with the situation as shown in the sixth section of FIG. 6 marked STEP 4. The auxiliary store is now empty and no pointers are held in Table 15.

Figure 7:
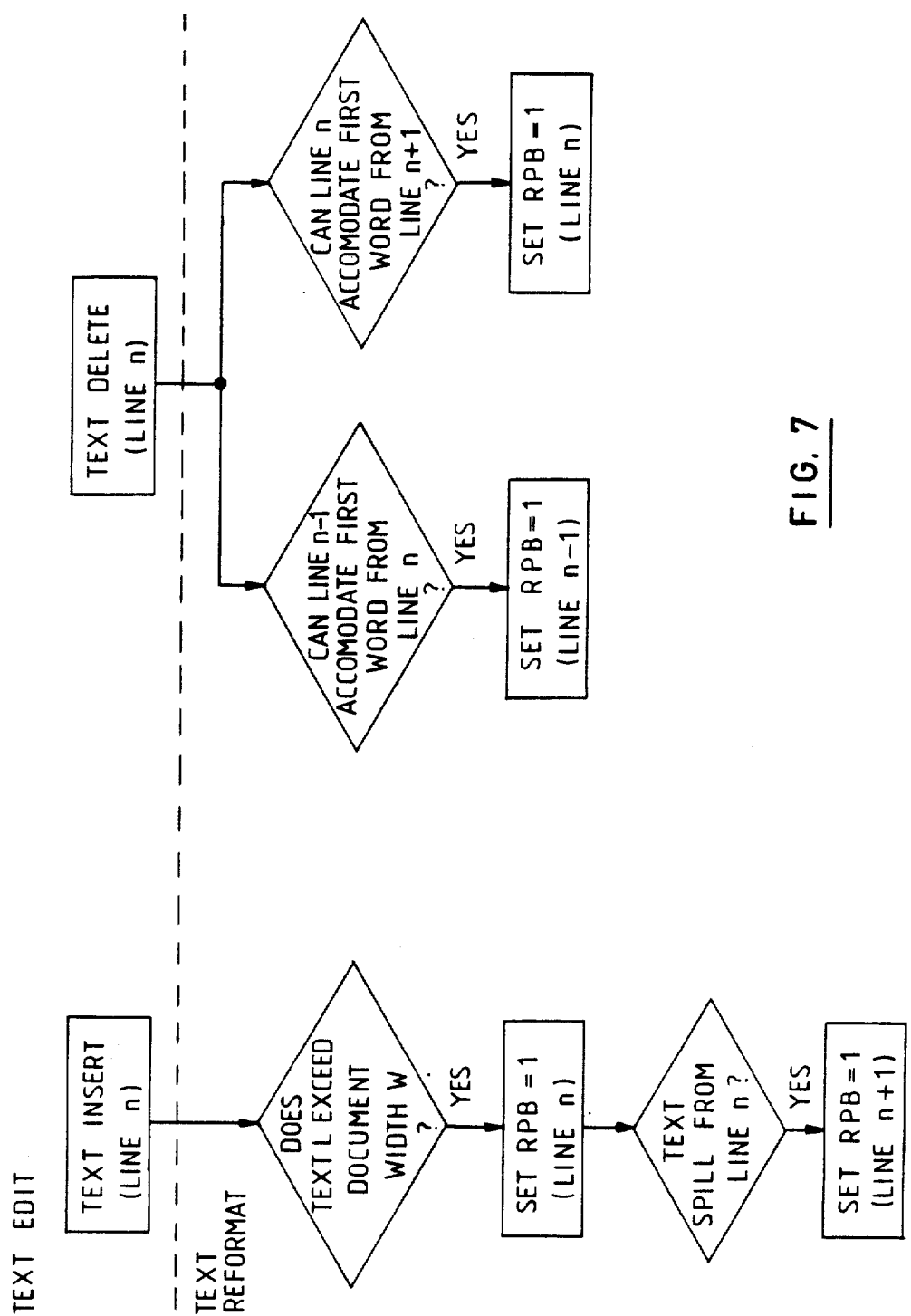
FIG. 7 shows a flow chart summarising the operations of the editor/reformatter during the performance of the edit/reformat operations described with reference to FIGS. 4, 5 and 6.

The background reformatting steps taken following text edit operations, described above with reference to FIGS. 4, 5 and 6, are determined by continuously monitoring the difference in values between the document width (W), the buffer capacity and the actual length of text (L) entered into each line during the text edit operation. It will be understood that these are not the only conditions that require text to be reformatted. Insertion of formatting control signals for example 'New Line' will also cause reformatting. However description of the features is not necessary for the understanding of the present invention and will not be given herein. The selected lines for reformatting are marked as described above by setting the Reformat Pending Bit for that line. The flow chart shown in FIG. 7 summarises the operations as described in the previous examples. In each case, the editing operation is performed on the current line (n) of the text and results, depending upon the nature of the text and the edit operation performed, in the Reformat Pending Bit for line (n−1), line (n) or line (n+1) being set.

The description of the text processing apparatus given so far has implied that the document store 5, auxiliary store 6, refresh buffer 3, cursor control circuit 4, text editor/formatter 14 and keystroke processor 9 are all provided as individual separate units. As will be apparent to those skilled in the art, this need not, and in most modern terminals, will not be the case. Thus, it is most likely that the cursor control will be implemented in software and that this function will be included in the common storage area of the terminal (e.g. random access memory) under microprocessor control. The main function of the terminal storage area is to provide storage space for the document but additionally sufficient locations may be allocated to serve as refresh buffers. A further region of the random access memory may be allocated to hold the various tables set-up and used by the editor/formatter. Finally, the text editor/formatter code itself may be located in a section of the random access memory or permanently held in a separate read-only memory.

The allocation and use of portions of the random access memory under microprocessor control in this way are quite conventional, and since they have no direct bearing on the present invention do not need to be described herein. An example of such a use is to be found in the aforementioned European Application No. 80302196.3 and also in our further co-pending European Application No. 80302192.2. This latter co-pending application describes a data processing terminal having an in-built microprocessor and random access memory that can be configured by a user to run a wide variety of different applications. The text editing/reformatting operation subject of the present invention is particularly suited to being run on such a terminal.

I claim:

1. Apparatus for editing and formatting text stored in a refresh buffer and display on a display device as lines, said apparatus comprising;
   (a) logic means for causing said text to be edited in response to keystroke signals received from a keyboard, and in absence of keystroke signals, for reformatting said edited text according to formatting requirements for said text; and
   (b) means included in said logic means for (1) delaying editing of said text in response to said keystroke signals if overflow of a line being edited will result from said editing, and (2) reformatting said line being edited in order to avoid overflow during subsequent editing.

2. Apparatus according to claim 1 wherein said logic means includes means, in response to said keystroke signals, for setting a flag indicating a need for reformatting said line.

* * * * *